US008480897B2

(12) United States Patent
Hwang et al.

(10) Patent No.: US 8,480,897 B2
(45) Date of Patent: Jul. 9, 2013

(54) IMPURITIES REMOVAL APPARATUS FOR A FLUID INCLUSION

(75) Inventors: Ki Yeon Hwang, Daejeon (KR); Hyo Lee, Daejeon (KR)

(73) Assignee: Future-Eng Co., Ltd., Chungbuk (KR)

( * ) Notice: Subject to any disclaimer, the term of this patent is extended or adjusted under 35 U.S.C. 154(b) by 728 days.

(21) Appl. No.: 12/599,744

(22) PCT Filed: Nov. 22, 2007

(86) PCT No.: PCT/KR2007/005905
§ 371 (c)(1),
(2), (4) Date: Nov. 11, 2009

(87) PCT Pub. No.: WO2008/156234
PCT Pub. Date: Dec. 24, 2008

(65) Prior Publication Data
US 2010/0219119 A1     Sep. 2, 2010

(30) Foreign Application Priority Data
Jun. 20, 2007    (KR) ................... 10-2007-0060389

(51) Int. Cl.
*B01D 29/25* (2006.01)
*B01D 29/37* (2006.01)
*B01D 29/94* (2006.01)
*B01D 35/02* (2006.01)
*B01D 35/16* (2006.01)
*B01D 35/22* (2006.01)

(52) U.S. Cl.
USPC ............ 210/312; 210/313; 210/407; 210/410

(58) Field of Classification Search
USPC ................... 210/312, 313, 410, 407
See application file for complete search history.

(56) References Cited

U.S. PATENT DOCUMENTS 322,722 A *  7/1885  Howes ................... 210/209
516,140 A *  3/1894  Weir .................... 210/209
(Continued)

FOREIGN PATENT DOCUMENTS

JP    11-114321      4/1999
KR    10-0747624 B1  8/2007

OTHER PUBLICATIONS

International Search Report for PCT/KR2007/005905 filed Nov. 22, 2007.

(Continued)

*Primary Examiner* — Thomas M Lithgow

(57) ABSTRACT

Disclosed is an apparatus for exhausting impurities included in a fluid, the apparatus including: a filtering net installation body; an impurity filtering net body; a fluid inflow pipe; a fluid exhaust pipe; a ball valve; and an air chamber housing (80) detachably assembled with a connecting part (70), which is inserted into and fixed to an inner periphery of an upper part of a hollow part (12) of the filtering net installation body (10), wherein the air chamber housing (80) includes an assembling part (82) assembled with the connector (70) and a collector (84) which is formed integrally with the assembling part (82) so as to communicate with the assembling part (82) and allows compressed air to be collected into the collector (82). In the apparatus, when a ball valve disposed at an intersection point between a fluid inflow pipe and a impurity exhaust pipe of a filtering net installation body is moved to a position where impurities is discharged so that supply of fluid is cut off, impurities piled up on the interior of the impurity exhaust pipe and fluid remaining therein are rapidly discharged outside through the impurity exhaust pipe due to pressure of compressed air collected into the interior of an air chamber housing positioned at an upper part of the filtering net installation body so that impurities are easily removed.

8 Claims, 10 Drawing Sheets

U.S. PATENT DOCUMENTS

| | | | | |
|---|---|---|---|---|
| 754,296 | A | * | 3/1904 | Foreman et al. .............. 210/414 |
| 4,055,500 | A | * | 10/1977 | Parker .......................... 210/412 |
| 5,467,796 | A | | 11/1995 | Pettinaroli et al. |
| 5,906,751 | A | * | 5/1999 | Parker .......................... 210/741 |
| 5,958,232 | A | * | 9/1999 | Chen ......................... 210/257.2 |
| 6,149,809 | A | | 11/2000 | Chen |
| 6,571,960 | B2 | * | 6/2003 | Williamson et al. .......... 210/420 |
| 2004/0256590 | A1 | | 12/2004 | Pettinaroli |

OTHER PUBLICATIONS

Written Opinion of the International Searching Authority for PCT/KR2007/005905 filed Nov. 22, 2007.

\* cited by examiner

IMPURITIES REMOVAL APPARATUS FOR A FLUID INCLUSION

TECHNICAL FIELD

The present invention relates to an impurity exhausting apparatus installed at a front part of a water gauge or a mechanical apparatus so as to remove the impurities mixed with a fluid, such as sand, iron dust, etc., and more particularly to an impurity exhausting apparatus, in which an air chamber housing is assembled with an inner periphery of an upper part of a filtering net installation body having an impurity filtering net disposed at an inside thereof so that impurities can be rapidly discharged by using compressed air in the interior of the air chamber.

BACKGROUND ART

In general, as an example of tap water among many kinds of fluids, although clean tap water is supplied from a purification plant, it is reality that a large amount of impurities are mixed with the tap water supplied to homes. Such impurities include impurities generated due to corrosion occurring as public water pipes are aged, and alien substances flowing when public water pipes are installed.

Because of this reason, people distrust the reliability of tap water, and also, impurities becomes a reason causing frequent problems in water gauges.

In order to solve this problem, the present applicant applied Korea Patent NO. 2006-0115195 (the title of the invention: Apparatus for Removing Impurities in Tap Water). As shown in FIGS. 1, and 2, the tap water impurity removing apparatus includes: a filtering net installation body 220, which has a hollow part 212 extending through the body, and a tap water inlet 222 formed at an upper part of the hollow part 212, and a tap water outlet 223 and a locking jaw 224, which are formed in the central part of the body; an impurity separation net part 210, which is inserted into the hollow part 212 of the filtering net installation body 220 and has a tap water inflow hole 213 and a filtering net 211 installed thereat; a plug 250 for intercepting an upper part of the filtering net installation body 220; a tap water inflow pipe 230, which has one side connected with the tap water inlet 222 of the filtering net installation body 220 and the other side connected with the tap water feeding pipe 201; a tap water exhaust pipe 240, which has one side connected with the tap water outlet 223 and the other side connected with a water gauge (not shown); a ball valve 260 installed at an intersection point between the tap water inflow pipe 230 and the filtering net installation body 220, the ball valve 260, which allows a lower part of the filtering net installation body 220 to be closed when the tap water inflow pipe 230 is opened and allows it to be opened when the tap water inflow pipe 230 is closed. If the upper and lower parts of the filtering net installation body 220 are blocked by the plug 250 and the ball valve 260, tap water introduced through the tap water supplying pipe 210 sequentially passes through the tap water inflow pipe 230, a filtering net installation body 220, an impurity filtering net body 210, a tap water exhaust pipe 240, and the water gauge (not shown), so that only tap water, in which impurities has been removed by the impurity filtering net body 210, can be discharged through the tap water exhaust pipe 240.

In this state, after impurities mixed with a fluid introduced to the impurity filtering net body are filtered by the filtering net, the impurities are piled up on the lower part of the filtering net installation body if tap water doesn't flow. The impurities piled up on the lower part of the filtering net installation body are rapidly discharged outside when the lower part of the filtering net installation body is opened by the operation of the ball valve installed at the intersection point between the tap water inflow pipe and the filtering net installation body.

However, in such a conventional apparatus, there is a disadvantage in that the tap water inflow pipe is blocked by the operation of the ball valve so that, due to low water pressure, impurities sticking to the impurity separation net body and impurities piled up on the lower part thereof are not easily discharged.

DISCLOSURE OF INVENTION

Technical Problem

Accordingly, the present invention has been made to solve the above-mentioned problems occurring in the prior art, and an object of the present invention is to provide an apparatus for exhausting impurities included in a fluid, in which fluid is filtered by a impurity filtering net body and impurities piled up on a lower part of the impurity filtering net body can be rapidly discharged by compressed inner air.

Also, another object of the present invention is to provide an apparatus for exhausting impurities in a fluid, in which a slanting through hole is formed at an outer periphery of a ball, and a fluid inflow pipe and the slanting through hole correspond to each other at a position where a ball corresponds to an impurity discharge position, i.e. a position where a fluid-passing hole corresponds to an impurity exhaust pipe so that impurities are rapidly discharged outside due to high hydraulic pressure through the impurity exhaust pipe.

Also, another object of the present invention is to provide an apparatus for exhausting impurities in a fluid, in which an assembling groove is formed at an outer periphery of a ball, and a horizontal hole and a slanting hole are formed at the assembling groove, and a fluid inflow pipe and the horizontal through hole correspond to each other at a position where a ball corresponds to an impurity position, i.e. a position where a fluid-passing hole corresponds to an impurity exhaust pipe so that high hydraulic pressure flows into the assembling groove so as to rapidly discharge impurities to the outside of the apparatus through the slanting hole, and fluid is supplied at one time due to interception of an inner interception ball so that impurities are rapidly exhausted.

Technical Solution

In accordance with one aspect of the present invention, there is provided an apparatus for exhausting impurities included in a fluid, the apparatus including: a filtering net installation body; an impurity filtering net body; a fluid inflow pipe; a fluid exhaust pipe; a ball valve; and an air chamber housing detachably assembled with a connecting part, which is inserted into and fixed to an inner periphery of an upper part of a hollow part of the filtering net installation body, wherein the air chamber housing includes an assembling part assembled with the connector and a collector which is formed integrally with the assembling part so as to communicate with the assembling part and allows compressed air to be collected into the collector.

In accordance with one aspect of the present invention, there is provided an apparatus for exhausting impurities included in a fluid, the apparatus including: a filtering net installation body; an impurity filtering net body; a plug: a fluid inflow pipe; a fluid exhaust pipe; and a ball valve, which includes a ball housing disposed at an intersection point between the fluid inflow pipe and the impurity exhaust pipe of the filtering net installation body, the ball housing having a ball inserting groove of a circular shape, a ball, which is rotatably inserted into the ball inserting groove of the ball housing and has a fluid-passing hole so as to communicate with the impurity exhaust pipe and an inner periphery of the fluid inflow pipe, and a lever detachably assembled with the ball so as to rotate the ball, wherein a slanting through hole is formed at an outer periphery of the ball.

In accordance with one aspect of the present invention, there is provided an apparatus for exhausting impurities included in a fluid, the apparatus including: a filtering net installation body; an impurity filtering net body; a plug: a fluid inflow pipe; a fluid exhaust pipe; and a ball valve which includes a ball housing disposed at an intersection point between the fluid inflow pipe and the impurity exhaust pipe of the filtering net installation body, the ball housing having a ball inserting groove having a circular shape, a ball, which is rotatably inserted into the ball inserting groove of the ball housing and has a fluid-passing hole so as to communicate with the impurity exhaust pipe and an inner periphery of the fluid inflow pipe, and a lever detachably assembled with the ball so as to rotate the ball, wherein an inserting protuberance having an assembling groove is integrally formed on an outer periphery of the ball, a finishing connector detachably assembled with the assembling groove, a slanting hole is formed at left side of the ball with a slant so as to communicate with the assembling groove, and a horizontal hole is formed at a right side so as to be communicated with the assembling groove, and an interception ball, which intercepts the slanting hole due to hydraulic pressure, is disposed within the assembling groove finished by the finishing connector.

Advantageous Effects

According to the method for exhausting impurities included in a fluid, when a ball valve disposed at an intersection point between a fluid inflow pipe and a impurity exhaust pipe of a filtering net installation body is moved to a position where impurities are discharged so that supply of fluid is cut off, impurities piled up on the interior of the impurity exhaust pipe and fluid remaining therein are rapidly discharged outside through the impurity exhaust pipe due to pressure of compressed air collected into the interior of an air chamber housing positioned at an upper part of the filtering net installation body so that impurities are easily removed.

Also, a slanting through hole is formed at the outer periphery of a ball included in a ball valve, and a fluid inflow pipe and the slanting through hole correspond to each other at a position where a ball corresponds to an impurity discharging position, i.e. a position where a fluid-passing hole corresponds to an impurity exhaust pipe so that impurities are rapidly discharged outside due to high hydraulic pressure through the impurity exhaust pipe.

Also, an assembling groove is formed at an outer periphery of a ball included in a valve, a horizontal hole and a slanting hole are formed at the assembling groove, and a fluid inflow pipe and the horizontal through hole correspond to each other at a position where a ball corresponds to an impurity position, i.e. a position where a fluid-passing hole corresponds to an impurity exhaust pipe so that high hydraulic pressure flows into the assembling groove so as to rapidly discharge impurities to the outside of the apparatus through the slanting hole, and fluid is supplied at one time due to interception of an inner interception ball so that impurities are rapidly exhausted.

BRIEF DESCRIPTION OF THE DRAWINGS

The above and other objects, features and advantages of the present invention will be more apparent from the following detailed description taken in conjunction with the accompanying drawings, in which.

BEST MODE FOR CARRYING OUT THE INVENTION

Hereinafter, exemplary embodiments of the present invention will be described with reference to the accompanying drawings.

However, the accompanying drawings are only for illustrative purposes so as to describe the spirit of the present invention in more detail, so the spirit of the present invention isn't limited to configurations incorporated in the accompanying drawings.

Figure 1:
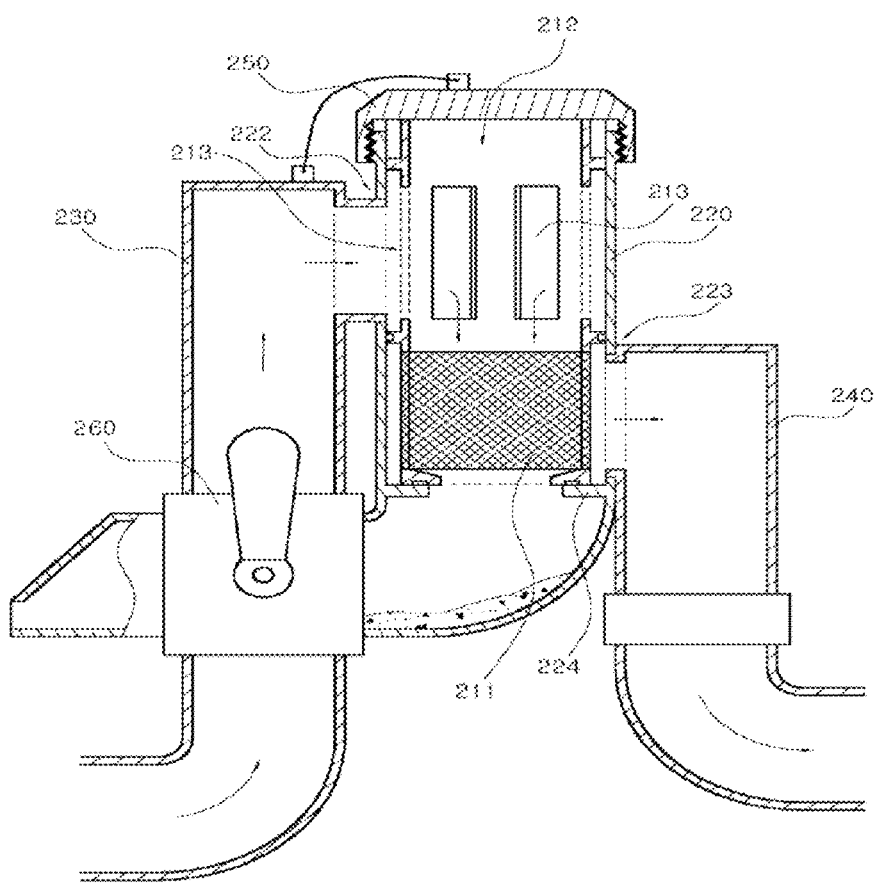
FIG. 1 is a sectional view illustrating a conventional apparatus for removing impurities included in tap water, in which an operation of filtering impurities and supplying tap water in a direction of a water gauge is shown.
Figure 2:
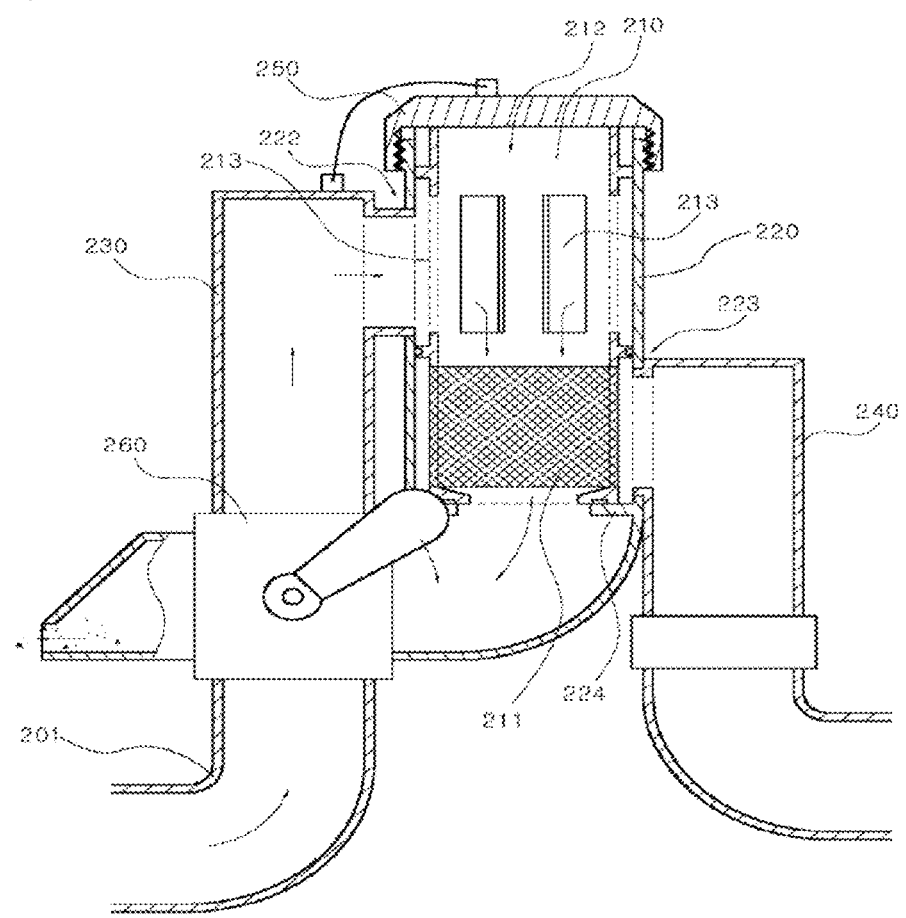
FIG. 2 is a sectional view of a conventional apparatus for removing impurities included in tap water, in which filtered impurities are discharged outside.
Figure 3:
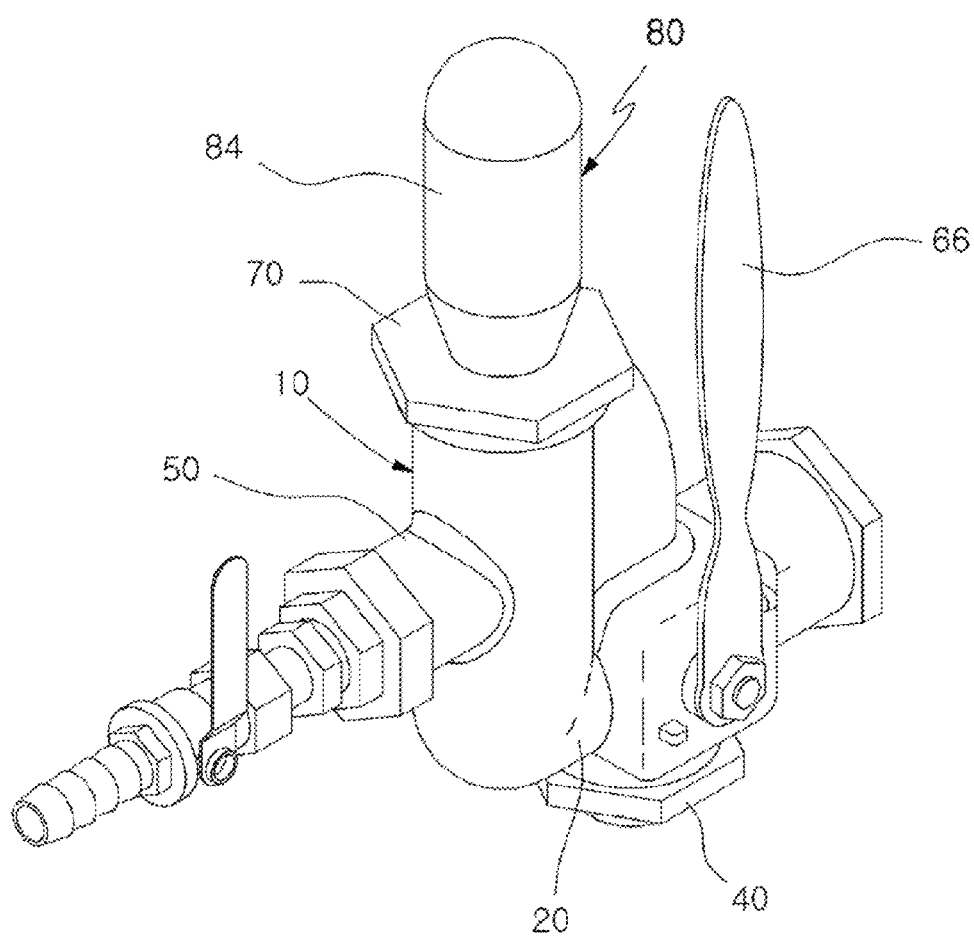
FIG. 3 is a perspective view of a structure of an apparatus for exhausting impurities included in a fluid according to the present invention.
Figure 4:
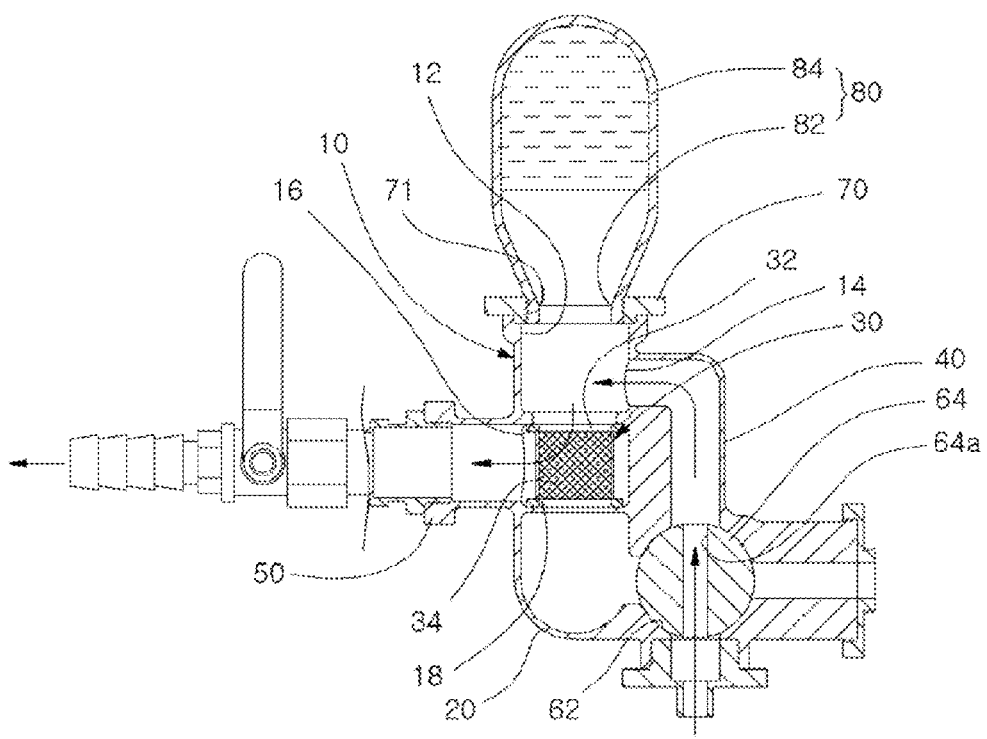
FIGS. 4 and 5 are sectional views of an apparatus for exhausting impurities included in a fluid according to the present invention, in which the operational state of the apparatus is shown.
Figure 5:
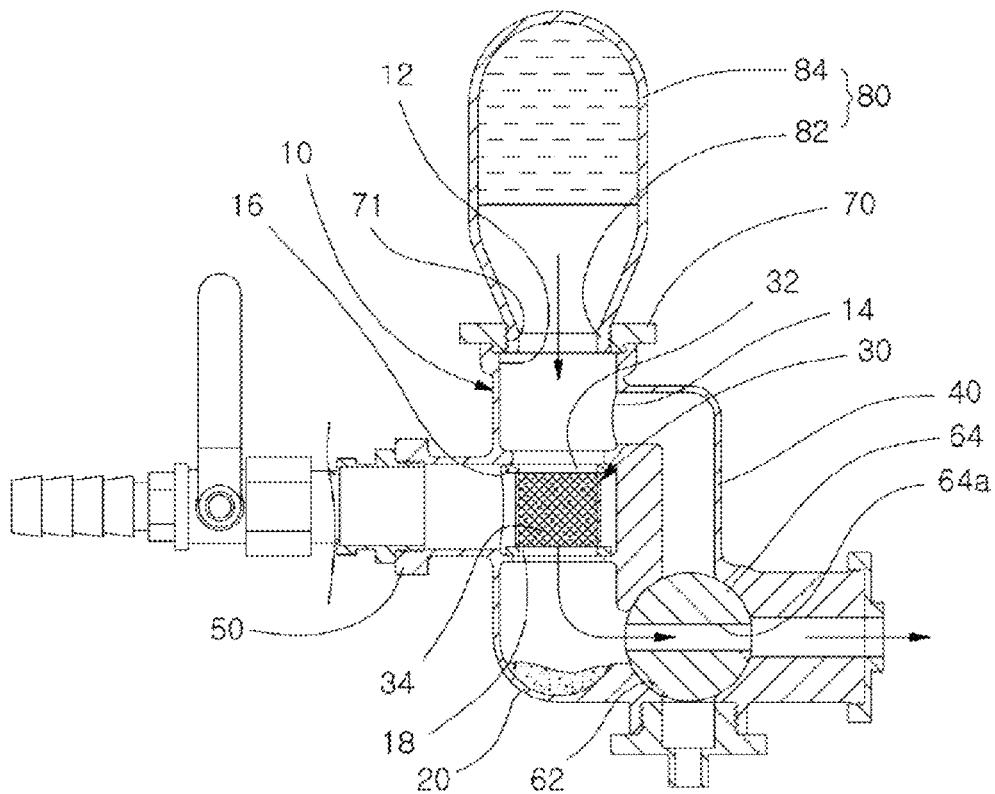

FIG. 3 is a perspective view of a structure of an apparatus for exhausting impurities included in a fluid according to the present invention, and FIGS. 4 and 5 are sectional views of an apparatus for exhausting impurities included in a fluid according to the present invention, in which the operational state of the apparatus is shown.

As shown in FIGS. 3 to 5, the apparatus for exhausting impurities included in a fluid includes a filtering net installation body 10, an impurity filtering net body 30, a fluid inflow pipe 40, a fluid exhaust pipe 50, and a ball valve 60.

The filtering net installation body 10 has a hollow part 12 extending through the body. The hollow part 12 has a fluid inlet 14 formed at an upper part thereof, a fluid outlet 16 and a locking jaw 18, which are formed at a central part thereof, and an impurity exhaust pipe 20 formed at a lower part thereof in such a manner that it communicates with the hollow part, impurities being piled up on and discharged through the impurity exhaust pipe.

The impurity filtering net body 30 is inserted into the hollow part 12 of the filtering net installation body 10 so as to be detachably seated on the upper part of the locking jaw 18. Also, the impurity filtering net body 30 has a filtering net hollow part 32 extending through the body, into which supplied fluid flows, and a filtering net 34 included at a lower portion of the impurity filtering net body 30 so as to correspond to the fluid outlet 16.

The fluid inflow pipe 40 has one side connected with the fluid inlet 14 of the filtering net installation body 10, and the other side having a fluid supply hole so as to allow fluid to be supplied to the inside of the filtering net installation body 10. Also, the fluid inflow pipe 40 is connected with the impurity exhaust pipe 20 disposed at a lower area of the filtering net installation body 10 in such a manner that it crosses and also communicates with the impurity exhaust pipe 20.

The fluid exhaust pipe 50 has one side connected with the fluid outlet 16 and the other side connected with the water gauge so that fluid introduced into the filtering net installation body 10 can be supplied through the water gauge and a feeding pipe of a mechanical device.

The ball valve 60 is disposed at an intersection point between the fluid inflow pipe 40 and the impurity exhaust pipe 20 of the filtering net installation body 10. The ball valve 60 includes a ball inserting groove 62 having a circular shape, a ball 64, which is rotatably inserted into the ball inserting groove 62 and has a fluid-passing hole 64a so as to communicate with the impurity exhaust pipe 20 and an inner periphery of the fluid inflow pipe 40, and a lever 66 detachably assembled with the ball 64 so as to rotate the ball 64.

Meanwhile, an outer periphery of a connecting part 70, on which a female screw part 71 is formed, is inserted so as to be fixed to an inner periphery of an upper part of the hollow part 12 of the filtering net installation body 10, and an air chamber housing 80 is detachably assembled with the female screw part 71 of the connecting part 70 so that compressed air is collected in the interior of the air chamber housing 80.

Figure 6:
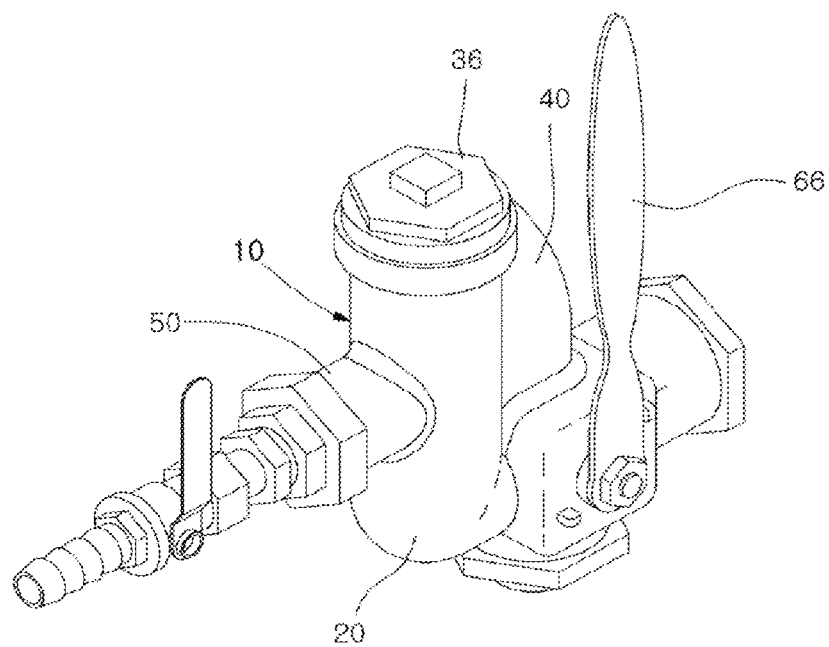
FIG. 6 is a perspective view of an apparatus for exhausting impurities included in a fluid according to a first embodiment of the present invention.
Figure 7:
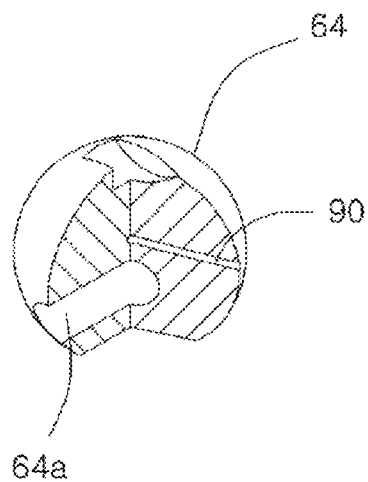
FIG. 7 is a perspective view of a main part of the apparatus shown in FIG. 6.
Figure 8:
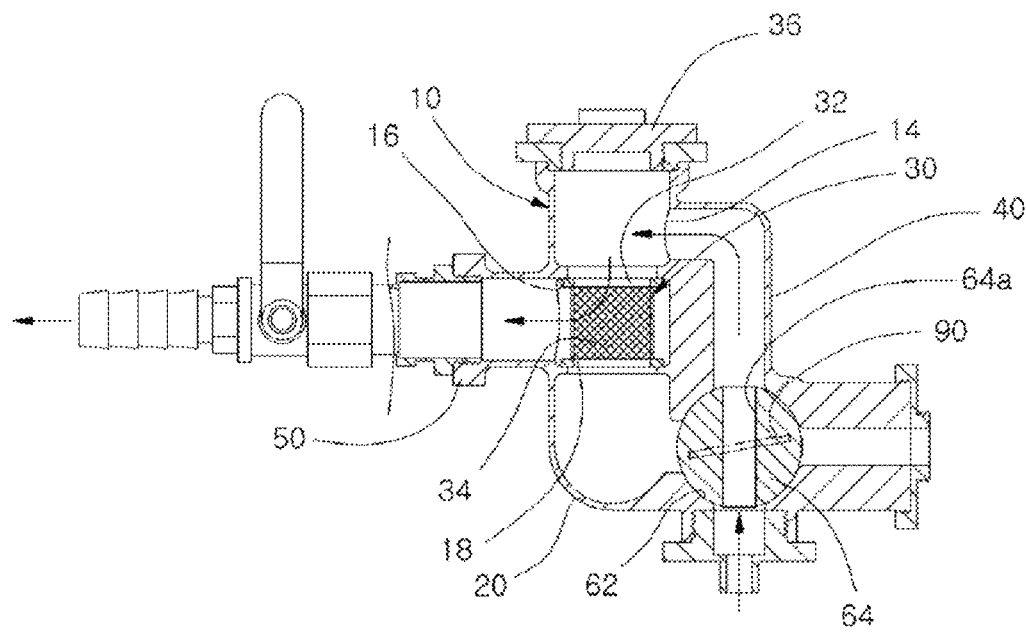
FIGS. 8 and 9 are sectional views of the apparatus shown in FIG. 6, in which the operational state of the apparatus is shown.
Figure 9:
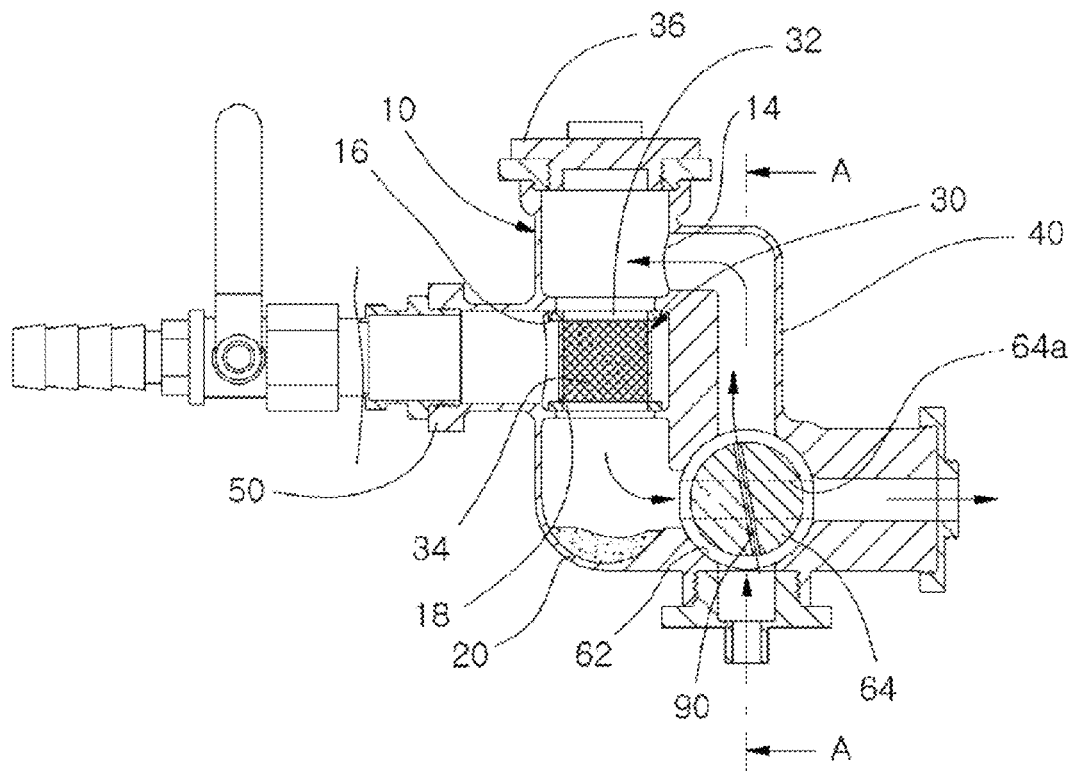
Figure 10:
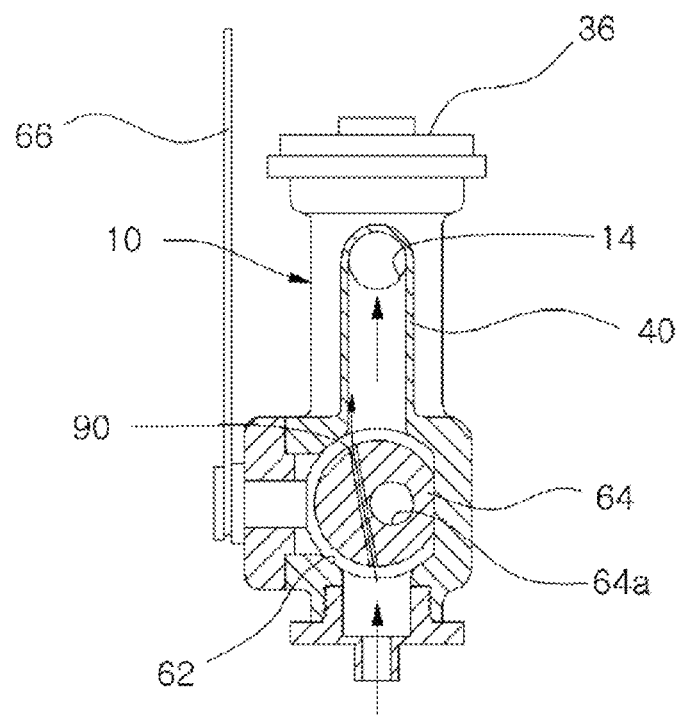
FIG. 10 is a sectional view taken along the line A-A of FIG. 9.

The air chamber housing 80 includes an assembling part 82 which is detachably assembled with the female screw part 71 of the connecting part 70, and a collector 84 which is formed integrally with the assembling part 82 so as to communicate therewith, and which allows compressed air to be collected in the interior thereof. FIG. 6 is a perspective view of an apparatus for exhausting impurities included in a fluid according to a first embodiment of the present invention, FIG. 7 is a perspective view of a main part of the apparatus shown in FIG. 6, FIGS. 8 and 9 are sectional views of the apparatus shown in FIG. 6, in which the operational state of the apparatus is shown, and FIG. 10 is a sectional view taken along line A-A of FIG. 9.

As shown in FIGS. 6 to 10, the apparatus for exhausting impurities included in a fluid according to the present invention includes the filtering net installation body 10, the impurity filtering net body 30, a plug 36, the fluid inflow pipe 40, the fluid exhaust pipe 50, and the ball valve 60.

The filtering net installation body 10 has a hollow part 12 extending through the body. The hollow part 12 has a fluid inlet 14 formed at an upper part thereof, a fluid outlet 16 and a locking jaw 18, which are formed at a central part thereof, and an impurity exhaust pipe 20 formed at a lower part thereof in such a manner that it communicates with the hollow part, impurities being piled up on and discharged through the impurity exhaust pipe.

The impurity filtering net body 30 is inserted into the hollow part 12 of the filtering net installation body 10 so as to be detachably seated on an upper part of the locking jaw 18. Also, the impurity filtering net body 30 has a filtering net hollow part 32 extending therethrough and the filtering net 34 formed at a lower portion thereof so as to correspond to the fluid outlet 16.

The plug 36 is fixedly assembled with an upper part of the filtering net installation body 10 so as to intercept the upper portion.

The fluid inflow pipe 40 has one side connected with the fluid inlet 14 of the filtering net installation body 10 and the other side connected with the fluid feeding pipe so as at supply fluid into the interior of the filtering net installation body 10. The fluid inflow pipe 40 is connected with the impurity exhaust pipe 20 of the lower portion of the filtering net installation body 10 in such a manner that it crosses with the impurity exhaust pipe 20 and communicates therewith.

The fluid exhaust pipe 50 has one side connected with the fluid outlet 16, and the other side connected with the water gauge and a feeding pipe of and a mechanical device so as to supply fluid introduced into the filtering net installation body 10.

The ball valve 60 is disposed at an intersection point between the fluid inflow pipe 40 and the impurity exhaust pipe 20 of the filtering net installation body 10. The ball valve 60 includes a ball inserting groove 62 having a circular shape, a ball 64, which is rotatably inserted into the ball inserting groove 62 and has a fluid-passing hole 64a so as to communicate with the impurity exhaust pipe 20 and an inner periphery of the fluid inflow pipe 40, and a lever 66 detachably assembled with the ball 64 so as to rotate the ball 64.

A slanting through-hole 90 is formed at the ball 64 of outer periphery of the water passing hole 64a.

The slanting through hole 90 extends through an upper area of a left side of the ball and a right side thereof while centering a position where the water passing hole 64a corresponds to the fluid inflow pipe 40. The slanting through hole 90 has a high left side and a lower right side.

At this time, the slanting through-hole 90 has a diameter smaller than a diameter of the fluid-passing hole 64a so that high pressure of fluid is applied to the slanting through-hole 90.

As such, the slanting through-hole 90 doesn't correspond to the impurity exhaust pipe 20 and the fluid inflow pipe 40 at a position where the fluid-passing hole 64a of the ball 64 corresponds to the fluid inflow pipe 40. Meanwhile, while the ball 64 rotates at 90 degrees in a clockwise direction so that the fluid-passing hole 64a corresponds to the impurity exhaust pipe 20, the right area of the slanting through-hole 90 corresponds to the fluid inflow pipe 40 so that fluid is successively supplied through the slanting through-hole 90 and thus impurities can be easily exhausted.

Figure 11:
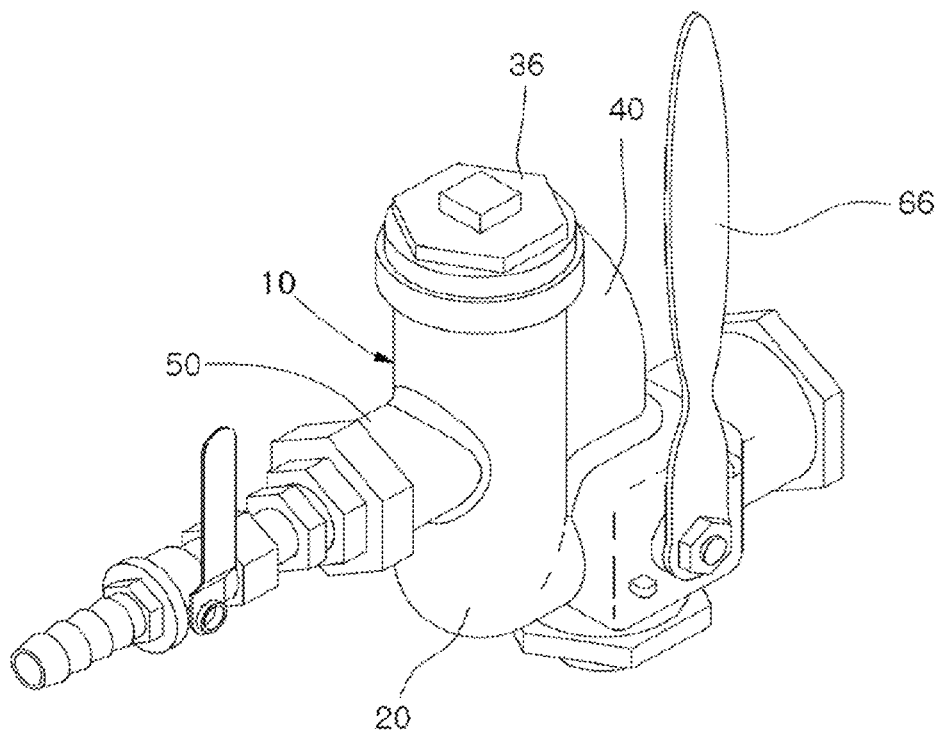
FIG. 11 is a perspective view of an apparatus for exhausting impurities included in a fluid according to a second embodiment of the present invention.
Figure 12:
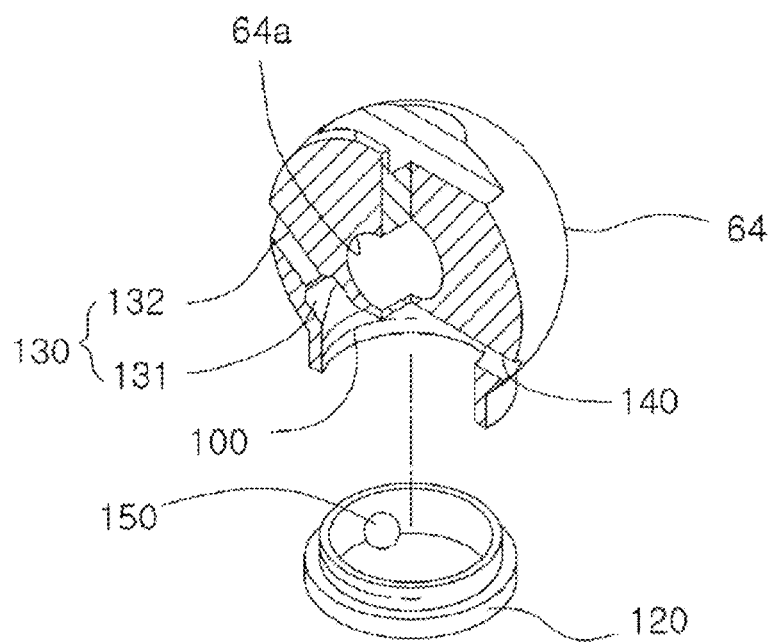
FIG. 12 is an exploded perspective view of a main body of the apparatus shown in FIG. 11.
Figure 13:
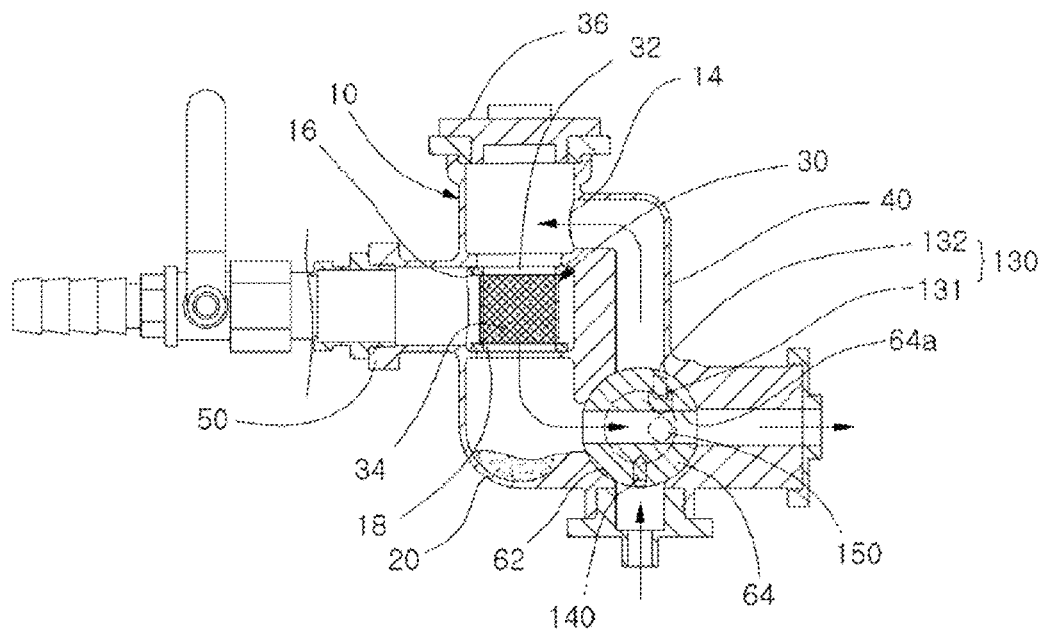
FIGS. 13 and 14 are sectional views of the apparatus shown in FIG. 11 in which the operational state of the apparatus is shown.
Figure 14:
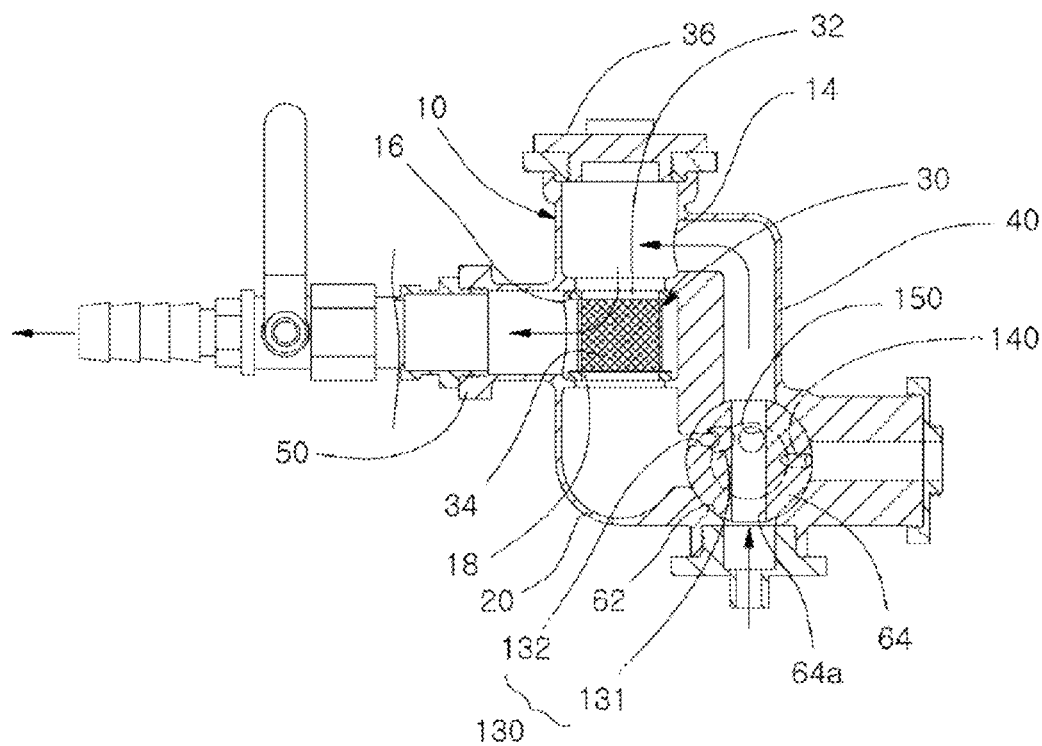
Figure 15:
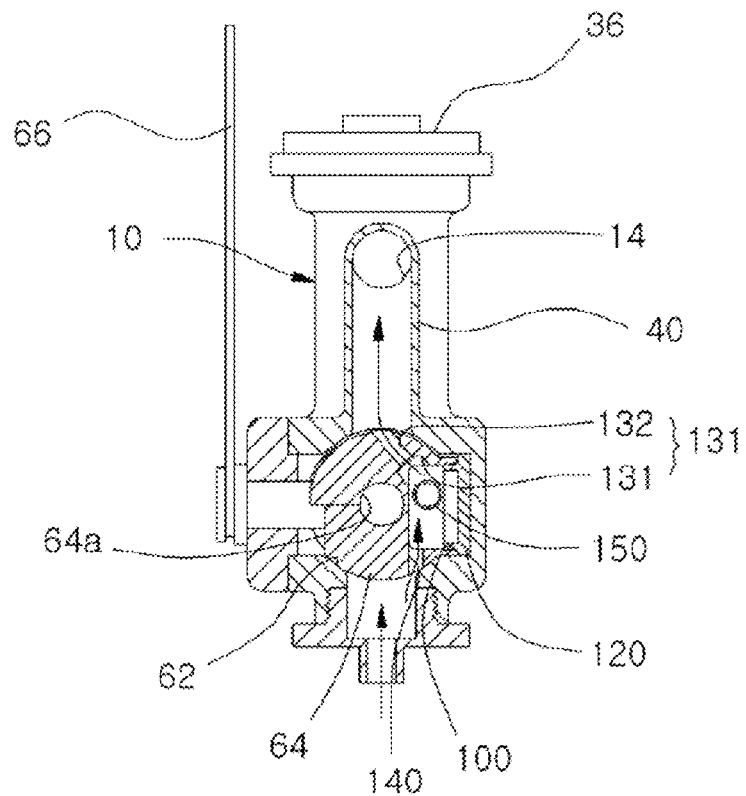
FIGS. 15 and 16 are sectional views of the apparatus shown in FIG. 14, in which the operational state of the apparatus is shown.
Figure 16:
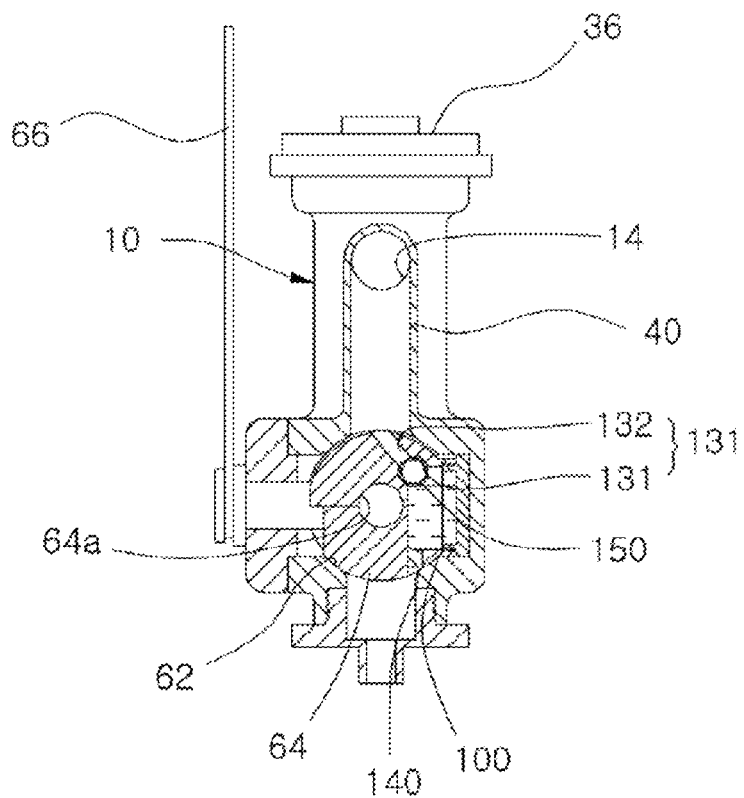

FIG. 11 is a perspective view of an apparatus for exhausting impurities included in a fluid according to a second embodiment of the present invention, FIG. 12 is an exploded perspective view of a main body of the apparatus shown in FIG. 11, FIGS. 13 and 14 are sectional views of the apparatus shown in FIG. 11 in which the operational state of the apparatus is shown, and FIGS. 15 and 15 are sectional views of the apparatus shown in FIG. 14, in which the operational state of the apparatus is shown.

As shown in FIGS. 11 to 16, the apparatus for exhausting impurities included in a fluid includes a filtering net installation body 10, an impurity filtering net body 30, a plug 36, a fluid inflow pipe 40, a fluid exhaust pipe 50, and a ball valve 60.

The filtering net installation body 10 has a hollow part 12 extending through the body. The hollow part 12 has a fluid inlet 14 formed at an upper part thereof, a fluid outlet 16 and a locking jaw 18, which are formed at a central part thereof, and an impurity exhaust pipe 20 formed at a lower part thereof in such a manner that it communicates with the hollow part, impurities being piled up on and discharged through the impurity exhaust pipe.

The impurity filtering net body 30 is inserted into the hollow part 12 of the filtering net installation body 10 so as to be detachably seated on the upper part of the locking jaw 18. Also, the impurity filtering net body 30 has a filtering net hollow part 32 extending through the body, into which supplied fluid flows, and a filtering net 34 included at a lower portion of the impurity filtering net body 30 so as to correspond to the fluid outlet 16.

The plug 36 is fixedly assembled with the upper part of the filtering net installation body 10 so as to intercept the upper portion.

The fluid inflow pipe 40 has one side connected with the fluid inlet 14 of the filtering net installation body 10 and the other side connected with the fluid feeding pipe so as to allow fluid to be supplied to the inside of the filtering net installation body 10. Also, the fluid inflow pipe 40 is connected with the impurity exhaust pipe 20 disposed at a lower area of the filtering net installation body 10 in such a manner that it crosses and also communicates with the impurity exhaust pipe 20.

The fluid exhaust pipe 50 has one side connected with the fluid outlet 16 and the one side connected with the water gauge and a feeding pipe of a mechanical device so that fluid introduced into the filtering net installation body 10 can be supplied.

The ball valve 60 is disposed at an intersection point between the fluid inflow pipe 40 and the impurity exhaust pipe 20 of the filtering net installation body 10. The ball valve 60 includes: a ball housing 62 having a ball inserting groove 62 of a circular shape; a ball 64, which is rotatably inserted into the ball inserting groove 62 of the ball housing 62 and has a fluid-passing hole 64a so as to communicate with the impurity exhaust pipe 20 and an inner periphery of the fluid inflow pipe 40; and a lever 66 detachably assembled with the ball 64 so as to rotate the ball 64.

An inserting protuberance 110 having an assembling groove 100 is integrally formed on an outer periphery of the ball 64, and a finishing connector 120 is detachably assembled with the assembling groove 100 by means of a screw.

Based on the fluid-passing hole 64a, a slanting hole 130 is formed at one side of the assembling groove 100, and a horizontal hole 140 is formed at the other side corresponding to the slanting hole 130.

The slanting hole 130 includes an interception ball inserting part 131 formed at an inner side of the assembling groove 100 and a water discharging part 132 extending upward from the interception ball inserting part 131 while making a slant so as to allow fluid to be discharged therethrough.

The horizontal hole 140 is formed in parallel with an inner end of the assembling groove 100, which corresponds to the interception ball inserting part 131.

Also, the water discharging part 132 of the slanting hole 130 is formed while maintaining a height equal to that of the fluid-passing hole 64a extending through a central portion of the ball and extends through the ball while being deviated toward one side. The horizontal hole 140 extends from a central area of the fluid-passing hole 64a extending through the central portion of the ball 64.

Also, an interception ball 150, which selectively intercepts the interception ball inserting part 131 of the slanting hole 130 according to supply of fluid, is disposed at an inside of the assembling groove 100 finished by a finishing connector 120.

At this time, it is preferable that the interception ball 150 may be a steel ball, which can rise to the surface of water.

The operation of the present invention structured as described above will be described below. As shown in FIGS. 4 and 5, the ball valve 60 disposed at the intersection point between the fluid inflow pipe 40 and the impurity exhaust pipe 20 of the filtering net installation body 10 is located at a position where fluid is supplied.

Then, fluid passes through the fluid feeding pipe, the fluid-passing hole 64a of the ball 64 included in the ball valve 60, and the fluid inflow pipe 40 so as to be supplied to the impurity filtering net body 30 disposed at the interior of the filtering net installation body 10. Impurities included in a fluid are filtered by the filtering net 34 of the lower portion of the impurity filtering net body 30. Simultaneously, impurities are piled up on the interior of the impurity exhaust pipe 20 of the filtering net installation body 10. Therefore, such filtered impurities are supplied to the water gauge and a feeding pipe of a mechanical device through the fluid exhaust pipe 50.

Simultaneously, a lower portion of the collector 84 of the air chamber housing, which is assembled with the female screw part 71 of the connecting part 70 fixed to an inner periphery of the upper part of the hollow part 12 of the filtering net installation body 10, is filled with fluid, and compressed air is collected into the upper portion of the interior of the collector 84.

In this state, the ball valve 60 included at the intersection point between the fluid inflow pipe 40 and the impurity exhaust pipe 20 of the filtering net installation body 10 is moved to a position where impurities are discharged.

That is, if the fluid-passing hole 64a of the ball 64 included in the ball valve 60 64 corresponds to the impurity exhaust pipe 20, the supply of fluid is blocked and impurities piled up on the interior of the impurity exhaust pipe 20 and fluid remaining in the interior thereof pass through the fluid-passing hole 64a of the ball 64 due to pressure of compressed air collected in the collector 84 of the air chamber housing 80 assembled with the upper portion of the filtering net installation body 10 so that they are rapidly exhausted outside through the impurity exhaust pipe 20.

Meanwhile, FIGS. 6 to 10 show the first embodiment of an apparatus of exhausting impurities included in a fluid. The operation of the apparatus will be described.

As shown in FIG. 8, the ball valve 60 disposed at the intersection point between the fluid inflow pipe 40 and the impurity exhaust pipe 20 of the filtering net installation body 10 is moved to a position where fluid is supplied.

Then, fluid passes through the fluid feeding pipe, the fluid-passing hole 64a of the ball 64 included in the ball valve 60, and the fluid inflow pipe 40 so as to be supplied to the impurity filtering net body 30 of the interior of the filtering net installation body 10. Also, impurities mixed with the fluid are filtered by the filtering net 34 of the lower portion of the impurity filtering net body 30, and simultaneously, the impurities are piled up on the interior of the impurity exhaust pipe 20 of the filtering net installation body 10. Accordingly, fluid, from which impurities are filtered, is supplied to the water gauge and the mechanical device through the fluid exhaust pipe 50.

In this state, as shown in FIGS. 9 and 10, the ball valve 60 disposed at the intersection point between the fluid inflow pipe 40 and the impurity exhaust pipe 20 of the filtering net installation body 10 is moved to a position where impurities are discharged.

That is, if the ball valve 60 is rotated at 90 degrees in a clockwise direction, the ball valve 60 is moved to the impurity discharging position so that the fluid-passing hole 64a corresponds to the impurity exhaust pipe 20, thereby intercepting supply of the fluid. At this time, low hydraulic pressure is applied to the interior of the impurity exhausting apparatus so that a state where it is not easy to exhaust impurities is maintained.

As such, the ball valve 60 is rotated so that a right portion of the slanting through hole 90 formed on that ball 64 with a slant corresponds to the fluid inflow pipe 40. Therefore, fluid is continuously and rapidly supplied inside through the slanting through hole 90 so that impurities are easily discharged.

In such a state where fluid doesn't flow toward the gauge, the apparatus is used for industrial purposes where other kinds of fluid, except for tap water, are used because there is a concern about water conduction.

Meanwhile, if the ball valve 60 is rotated with 90 degrees in a counterclockwise direction, the ball valve 60 is moved to an impurity discharging position so that the fluid-passing hole 64a corresponds to the impurity exhaust pipe 20. Therefore, the supply of the fluid is cut off. At this time, low hydraulic pressure is applied to the interior of the impurity exhausting apparatus so that a state where it is not easy to exhaust impurities is maintained.

After use, if the ball valve 60 is rotated 45 degrees in a counterclockwise direction, the fluid-passing hole 64a of the ball valve 60 doesn't correspond to any one of the impurity exhaust pipe 20 and fluid inflow pipe 40 so that supply of fluid is cut off.

Moreover, FIGS. 11 to 16 show the second embodiment of the apparatus for exhausting impurities included in a fluid, and the operation of the apparatus will be described. As shown in FIG. 13, the ball valve 60 is disposed at the intersection point between the fluid inflow pipe 40 and the impurity exhaust pipe 20 of the filtering net installation body 10 is moved to a fluid supplying position.

Then, fluid passes through the fluid feeding pipe, the fluid-passing hole 64a of the ball 64 included in the ball valve 60, and the fluid inflow pipe 40 so as to be supplied to the impurity filtering net body 30 of the interior of the filtering net installation body 10. Also, impurities mixed with the fluid are filtered by the filtering net 34 of the lower portion of the impurity filtering net body 30, and impurities are simultaneously piled up on the interior of the impurity exhaust pipe 20 of the filtering net installation body 10. Accordingly, fluid, from which the impurities have been filtered, is supplied to the gauge and the mechanical device through the fluid exhaust pipe 50.

In this state, as shown in FIG. 14, the ball valve 60 disposed at the intersection point between the fluid inflow pipe 40 and the impurity exhaust pipe 20 of the filtering net installation body 10 is moved to the impurity discharging position.

Particularly, if the ball valve 60 is rotated with 90 degrees in a clockwise direction, the ball valve 60 is moved to an impurity discharging position so that the fluid-passing hole 64a corresponds to the impurity exhaust pipe 20. Therefore, the supply of the fluid is cut off. At this time, low hydraulic pressure is applied to the interior of the fluid impurity exhausting apparatus so that a state where it is not easy to exhaust impurities is maintained.

As such, as the ball valve 60 is rotated, the horizontal hole 140, which horizontally extends from an inner end of the assembling groove 100 while corresponding to the slanting hole 130 formed on an outer periphery of the assembling groove 100 so as to communicate therewith based on the fluid-passing hole 64a, corresponds to the fluid inflow pipe 40. Therefore, fluid having proper pressure flows into the inside of the assembling groove 100 finished by the finishing connector 120 through the horizontal hole 140.

As such, while making a whirlpool due to own hydraulic pressure, the fluid flowed into the assembling groove 100 is discharged into the interior of the apparatus through the slanting hole 130 positioned opposite to the horizontal hole 140 so that impurities is exhausted outside.

As such, the fluid is exhausted outside, and simultaneously, the interception ball 150, which is moving within the assembling groove 100 due to hydraulic pressure, rapidly intercepts an inner periphery of the slanting hole 130, thereby intercepting supply of fluid. That is, fluid is supplied at one time so that impurities are rapidly exhausted (see FIGS. 15 and 16).

Meanwhile, when use of the ball valve 60 is stopped, if the ball valve 60 is rotated 45 degrees in an counterclockwise direction, the fluid-passing hole 64a of the ball valve 60 doesn't correspond to any one of the impurity exhaust pipe 20 and the fluid inflow pipe 40 so that a state of water supplying being cut off is maintained.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. An apparatus for removing impurities included in a fluid, the apparatus comprising:
    a housing coupled to a fluid supply inlet, the housing having therein a fluid inlet, a fluid outlet, and an impurity exhaust pipe;
    an impurity filtering net body provided within the hollow part of the filtering net installation body and having a filter;
    a fluid inflow pipe being coupled to the fluid inlet of the housing;
    a fluid exhaust pipe being coupled to the fluid outlet of the housing; and
    a ball valve including a ball housing and a lever, the ball housing disposed at an intersection between the fluid inflow pipe and the impurity exhaust pipe of the housing;
    a ball provided within the ball housing, the ball having a first path having a first cross-section and a second path having a second cross-section that is smaller than the first cross-section,
    wherein the lever is used to rotate the ball so that the first path or the second path is connecting the fluid supply inlet and the fluid inflow pipe,
    wherein the first path of the ball is configured to pass fluid between the fluid supply inlet and the fluid inflow pipe at a first speed, and the second path of the ball is configured to pass fluid between the fluid supply inlet and the fluid inflow pipe at a second speed, and
    wherein the second speed is faster than the first speed so that the impurities trapped in the fluid exhaust pipe can be removed more effectively.

2. An apparatus for filtering impurities included in a fluid, the apparatus comprising:
    a filtering net installation body including a hollow part, the hollow part having a fluid inlet, a fluid outlet, and an impurity exhaust pipe which are respectively formed at an upper part, a central part, and a lower part thereof;
    an impurity filtering net body being inserted in the hollow part of the filtering net installation body and having a filtering net at a lower portion of the impurity filtering net body so as to correspond to the fluid outlet of the filtering net installation body;

a fluid inflow pipe being coupled to the fluid inlet of the filtering net installation body and to the impurity exhaust pipe of the filtering net installation body;

a fluid exhaust pipe being coupled to the fluid outlet of the filtering net installation body; and a ball valve including a ball housing disposed at an intersection between the fluid inflow pipe and the impurity exhaust pipe of the filtering net installation body, a ball, and a lever, wherein the ball housing includes a ball inserting groove of a circular shape into which the ball is rotatably inserted, wherein the lever is detachably assembled with the ball so as to rotate the ball, and wherein the ball has a fluid-passing hole so as to communicate with the impurity exhaust pipe and the fluid inflow pipe and a slanting through hole passing through the ball and having a smaller diameter than that of the fluid-passing hole so as to increase a speed of fluid through the slanting through hole.

3. The apparatus as claimed in claim 2, wherein, if a center line along the fluid-passing hole of the ball is parallel to that of the fluid inflow pipe, the slanting through hole passes through the ball in such a manner that a vertical distance of a first end of the slanting through hole from a bottom end of the fluid-passing hole is different from that of a second end of the slanting through hole.

4. An apparatus for removing impurities included in a fluid, the apparatus comprising:

a filtering net installation body including a hollow part, the hollow part having a fluid inlet, a fluid outlet, and an impurity exhaust pipe which are respectively formed at an upper part, a central part, and a lower part thereof;

an impurity filtering net body being inserted into the hollow part of the filtering net installation body and having a filtering net at a lower portion of the impurity filtering net body so as to correspond to the fluid outlet of the filtering net installation body;

a fluid inflow pipe being coupled to the fluid inlet of the filtering net installation body and to the impurity exhaust pipe of the filtering net installation body;

a fluid exhaust pipe being coupled to the fluid outlet of the filtering net installation body; and a ball valve including a ball housing, a lever, and a ball, the ball housing disposed at an intersection between the fluid inflow pipe and the impurity exhaust pipe of the filtering net installation body and including a ball inserting groove of a circular shape into which the ball is rotatably inserted, the lever being detachably assembled with the ball so as to rotate the ball, wherein the ball has a fluid-passing hole so as to communicate with the impurity exhaust pipe and the fluid inflow pipe, a slanting hole being formed at a first side of the ball with a slant so as to communicate with an assembling groove, and a horizontal hole being formed at a second side of the ball so as to communicate with the assembling groove, the assembling groove is integrally formed along an outer periphery of the ball, and wherein a finishing connector is detachably assembled with the assembling groove and an interception ball intercepting the slanting hole due to hydraulic pressure is disposed within the assembling groove coupled to the finishing connector.

5. The apparatus as claimed in claim 4, wherein the slanting hole includes an interception ball inserting part and a fluid discharging part, the interception ball inserting part being formed at an inner end of the assembling groove and allowing the interception ball to make a close contact with the interception ball inserting part, and the fluid discharging part extending upward from the interception ball inserting part with a slant while corresponding to a central portion of the fluid-passing hole so as to allow fluid to be exhausted.

6. The apparatus as claimed in claim 2, wherein if the ball valve is in a given position, the fluid-passing hole couples to the fluid inflow pipe so as to supply filtered fluid to a water gauge and a mechanical device through the fluid exhaust pipe.

7. The apparatus as claimed in claim 6, wherein if the ball valve is rotated at 90 degrees in a clockwise direction from the position, the slanting through hole couples to the fluid inflow pipe so as to supply the fluid at a faster speed.

8. The apparatus as claimed in claim 6, wherein if the ball valve is rotated at 90 degrees in a counterclockwise direction from the position, the fluid-passing hole couples to the impurity exhaust pipe so as to stop supplying the fluid.

* * * * *